US012585741B2

(12) United States Patent
Gupta

(10) Patent No.: US 12,585,741 B2
(45) Date of Patent: Mar. 24, 2026

(54) PASSWORD PROMPT FOR SECURE CAMERA ACTIVATION

(71) Applicant: Dell Products L.P., Round Rock, TX (US)

(72) Inventor: Mahendra Gupta, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 30 days.

(21) Appl. No.: 18/677,622

(22) Filed: May 29, 2024

(65) Prior Publication Data

US 2025/0371116 A1 Dec. 4, 2025

(51) Int. Cl.
G06F 21/00 (2013.01)
G06F 21/31 (2013.01)
G06F 21/60 (2013.01)
G06F 21/81 (2013.01)

(52) U.S. Cl.
CPC ............ G06F 21/31 (2013.01); G06F 21/602 (2013.01); G06F 21/81 (2013.01)

(58) Field of Classification Search
CPC ......... G06F 21/31; G06F 21/602; G06F 21/81
See application file for complete search history.

(56) References Cited

U.S. PATENT DOCUMENTS

| | | | | |
|---|---|---|---|---|
| 9,038,164 B2 * | 5/2015 | Nunami | .................. | G06F 21/32 726/17 |
| 11,714,887 B2 * | 8/2023 | Agrawal | ................ | H04N 23/45 726/18 |
| 2008/0205642 A1 * | 8/2008 | Yururi | .................. | H04N 1/4406 380/200 |
| 2016/0019547 A1 * | 1/2016 | Gurnani | ................. | G06Q 20/40 705/44 |
| 2016/0314374 A1 * | 10/2016 | Braumandl | ............ | H04N 23/10 |
| 2021/0081003 A1 * | 3/2021 | Bristol | .................... | G06F 21/83 |
| 2022/0232390 A1 * | 7/2022 | Fouchard | .............. | H04W 12/50 |
| 2022/0400012 A1 * | 12/2022 | Tran | ...................... | H04L 63/102 |

* cited by examiner

*Primary Examiner* — Ghazal B Shehni
(74) *Attorney, Agent, or Firm* — Workman Nydegger

(57) ABSTRACT

One example method includes detecting that a camera cover switch has been activated to open a cover of a camera of a computing system, the opening of the cover activating the camera for use. In response, prompting a user of the computing system to enter authorization user input that indicates the user is authorized to use the camera. Waiting a predetermined amount of time to receive the predefined user input. In response to not receiving the authorization user input within the predetermined amount of time, automatically rendering the camera inoperable.

18 Claims, 8 Drawing Sheets

116

100

Camera Cover Switch has been Activated. Please Enter Password Within 30 Seconds 410

Enter Password 420

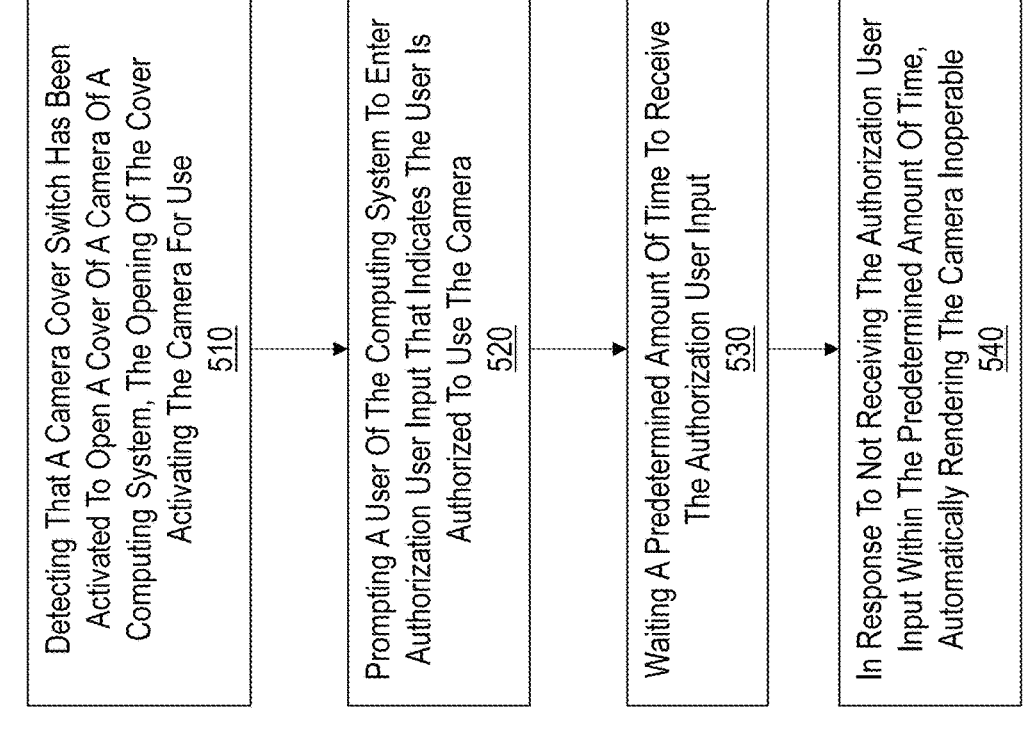

500

Detecting That A Camera Cover Switch Has Been Activated To Open A Cover Of A Camera Of A Computing System, The Opening Of The Cover Activating The Camera For Use
510

Prompting A User Of The Computing System To Enter Authorization User Input That Indicates The User Is Authorized To Use The Camera
520

Waiting A Predetermined Amount Of Time To Receive The Authorization User Input
530

In Response To Not Receiving The Authorization User Input Within The Predetermined Amount Of Time, Automatically Rendering The Camera Inoperable
540

FIG. 5

PASSWORD PROMPT FOR SECURE CAMERA ACTIVATION

TECHNOLOGICAL FIELD OF THE DISCLOSURE

Embodiments disclosed herein generally relate to computing system security. More particularly, at least some embodiments relate to systems, hardware, software, computer-readable media, and methods for requiring predetermined user input for secure camera activation.

BACKGROUND

With the increasing prevalence of remote work and online communication, built-in laptop cameras have become a common feature. However, concerns about privacy and unauthorized access to these cameras have also emerged. Malicious actors can potentially gain access to a laptop's camera, compromising the user's privacy and security. Existing security measures, such as camera covers or physical switches, may not always be foolproof or convenient.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

FIG. 5 discloses a method according to the embodiments disclosed herein.

DETAILED DESCRIPTION OF SOME EXAMPLE EMBODIMENTS

Embodiments disclosed herein generally relate to computing system security. More particularly, at least some embodiments relate to systems, hardware, software, computer-readable media, and methods for requiring predetermined user input for secure camera activation.

One example method includes detecting that a camera cover switch has been activated to open a cover of a camera of a computing system, the opening of the cover activating the camera for use. In response, prompting a user of the computing system to enter authorization user input that indicates the user is authorized to use the camera. Waiting a predetermined amount of time to receive the authorization user input. In response to not receiving the authorization user input within the predetermined amount of time, automatically rendering the camera inoperable.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect (s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

Figure 1A:
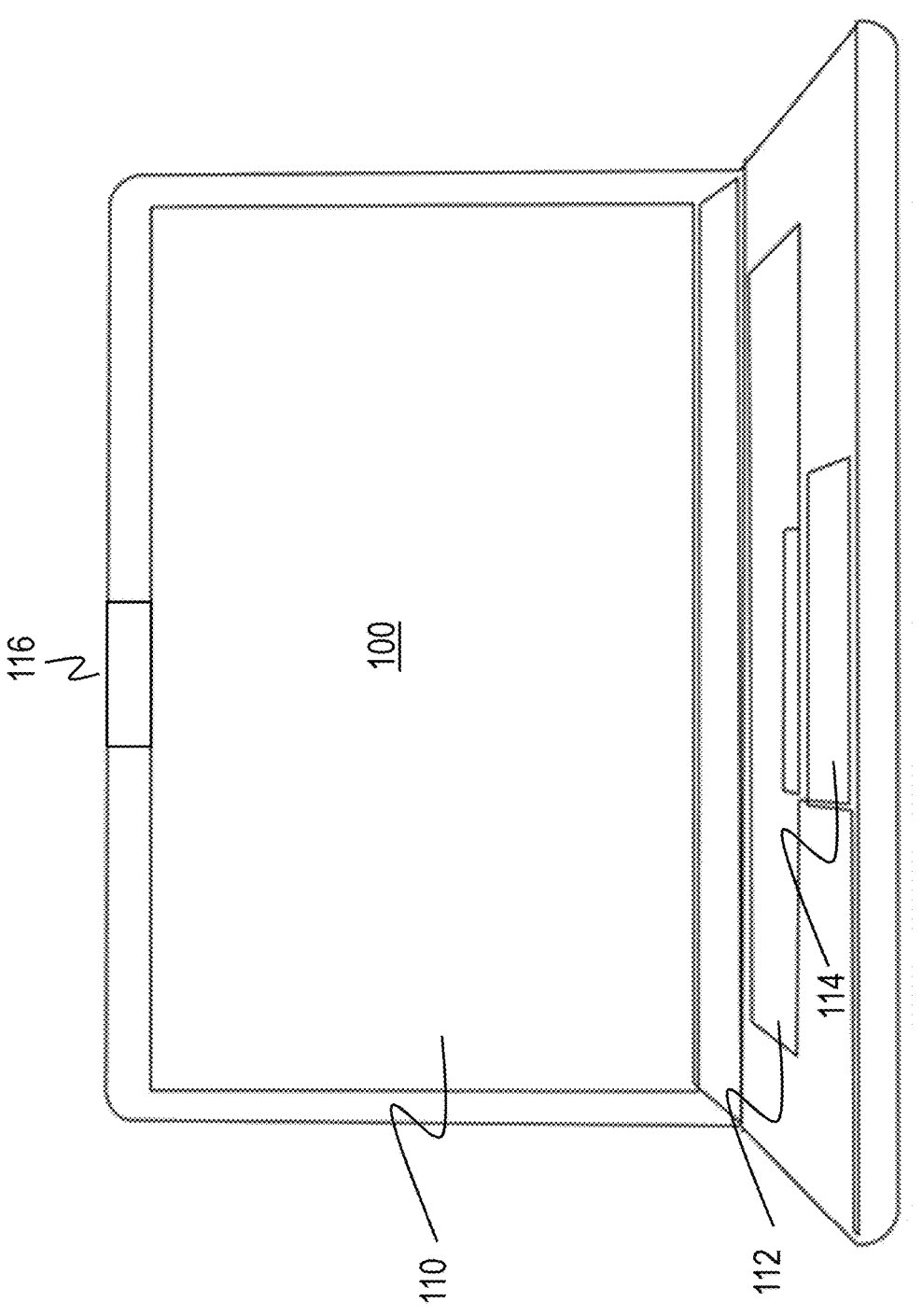
FIGS. 1A-1C disclose aspects of a computing system and its camera according to the embodiments disclosed herein.

FIG. 1A illustrates an embodiment of a computing system 100 in which the embodiments disclosed herein may be practiced. The computing system 100 may be any reasonable computing system and in some embodiments is a laptop computing system or a mobile device such as a mobile phone or tablet computing device. Thus, the embodiments disclosed herein are limited to any particular type of computing system. As illustrated, in some embodiments the computing system 100 includes a screen 110 that is configured for displaying data to a user of the computing system 100, a keyboard 112 that is configured to allow the user to input data, and a mouse 114 that is configured to allow the user of the computing system 100 to control active applications, windows, and like that are operating on the computing system 100. The computing system 100 also includes a camera 116.

Figure 1B:
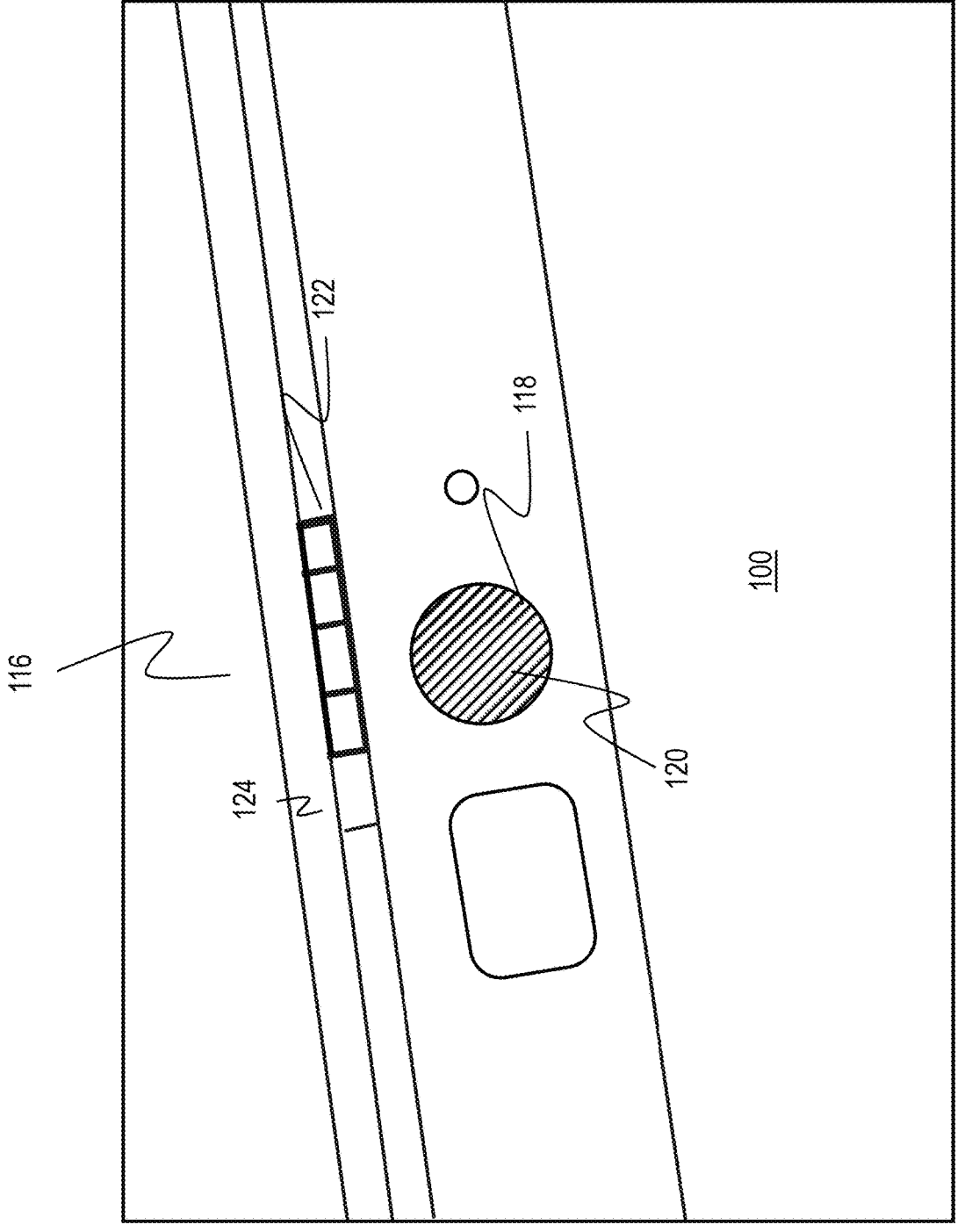
Figure 1C:
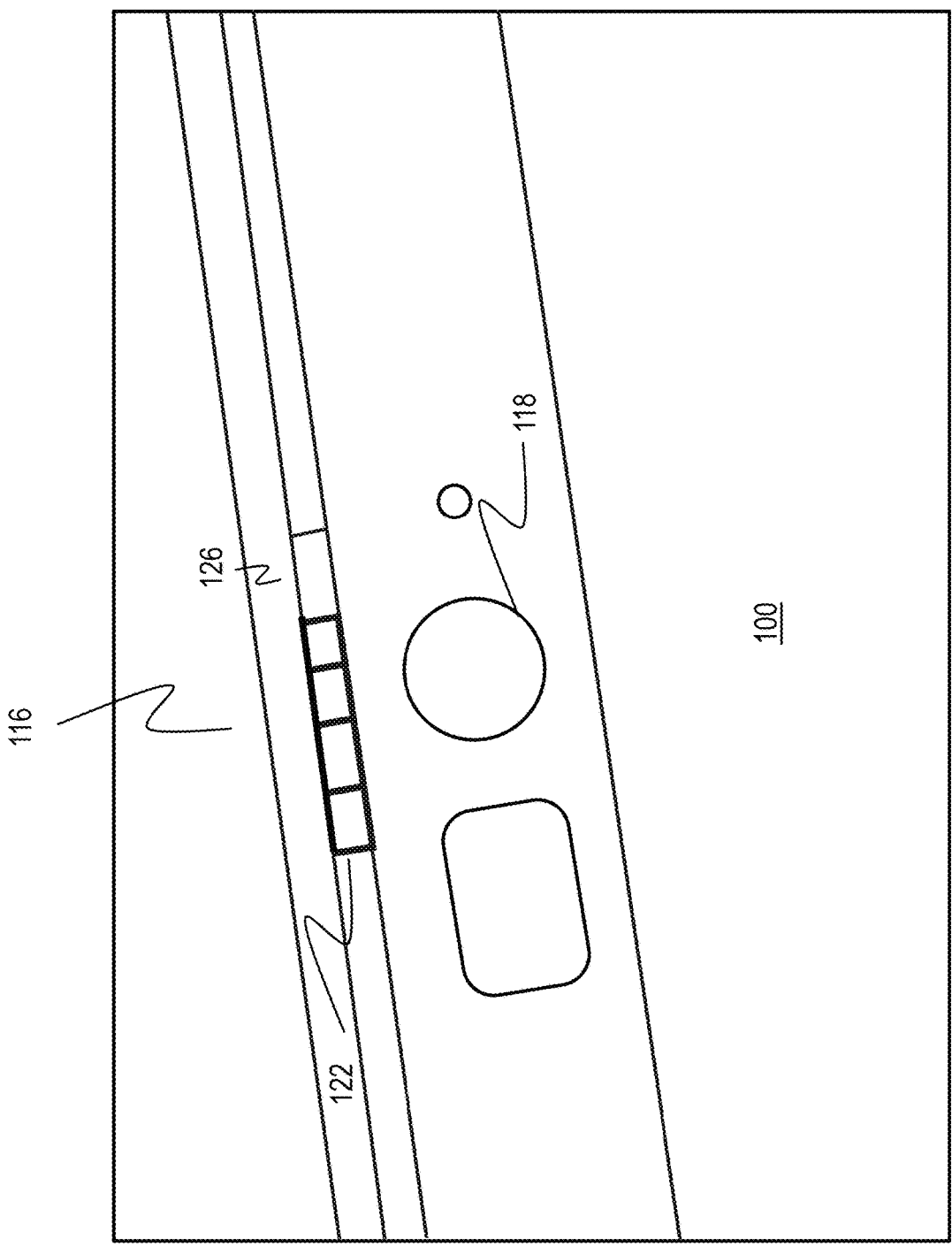

FIGS. 1B and 1C illustrate one embodiment of the camera 116, which may be any reasonable computing system camera. As illustrated in these figures, the camera 116 includes a camera lens 118. When activated, the camera 116 and its lens 118 captures a view of the direction it is facing. This allows the user of the computing system 100 to show himself or herself during a video call or the like. In addition, the camera 116 and its lens 118 will capture at least part of the location in which the computing system 100 is located.

In FIG. 1B, the camera lens 118 is covered by a camera cover 120. In some embodiments, the camera 116 is not activated when the camera cover 120 is covering the camera lens 118. In such embodiments, the camera 116 includes a camera cover switch 122, which may also be referred to a camera shutter. To activate the camera 116, the user of the computing system 100 activates the camera cover switch 122 by moving the camera cover switch 122 into a gap 124 that in the embodiment is to the left of the camera cover switch 122.

FIG. 1C shows when the camera cover switch 122 has been moved into the gap 124. The camera cover 120 is removed from the lens 118. The movement of the camera cover switch 122 is detected by the computing system 100 and the camera 116 is activated, allowing the user of the computing system 100 to use the camera 116. To deactivate the camera 116, the user of the computing system 100 activates the camera cover switch 122 by moving the camera cover switch 122 into a gap 126 that in the embodiment is to the right of the camera cover switch 122. This movement of the camera cover switch 122 causes the camera cover 120 to cover the camera lens 118 once again as shown in FIG. 1B.

The computing system 100, especially the embodiment where the computing system is a laptop computing system or a mobile device, can be used in many locations that are not as secured as a traditional office or work location. For example, the computing system 100 is often used at home. Sometimes the user of the computing system 100 may not lock the computing system when he or she is away from the computing system for a short period of time. In such circumstances, another person may activate the camera cover switch 122 by moving it to the gap 124, thus activating the camera 116. This activation may be innocent, such as a child of the user of the computing system 100 innocently moving the camera cover switch 122. Alternatively, it may be malicious, such as by a malicious person who desires to activate the camera 116 for malicious purpose.

In either case, the activation of the camera 116 without the consent of the user of the computing system 100 may leave the computing system vulnerable to security and privacy risks. For example, the camera 116 may capture at the location of the computing system 100 personal identifying information such as pictures that the user wants to keep private or that might be used to identify the user or his or her family members in an undesirable way. Alternatively, the camera 116 may capture work proprietary documents or information or other sensitive information such as a bank record that the user does not intend to be captured by the camera. The captured information is vulnerable to being accessed by the malicious person if they are able to hack into the computing system or otherwise gain access to the captured camera data.

Figure 2:
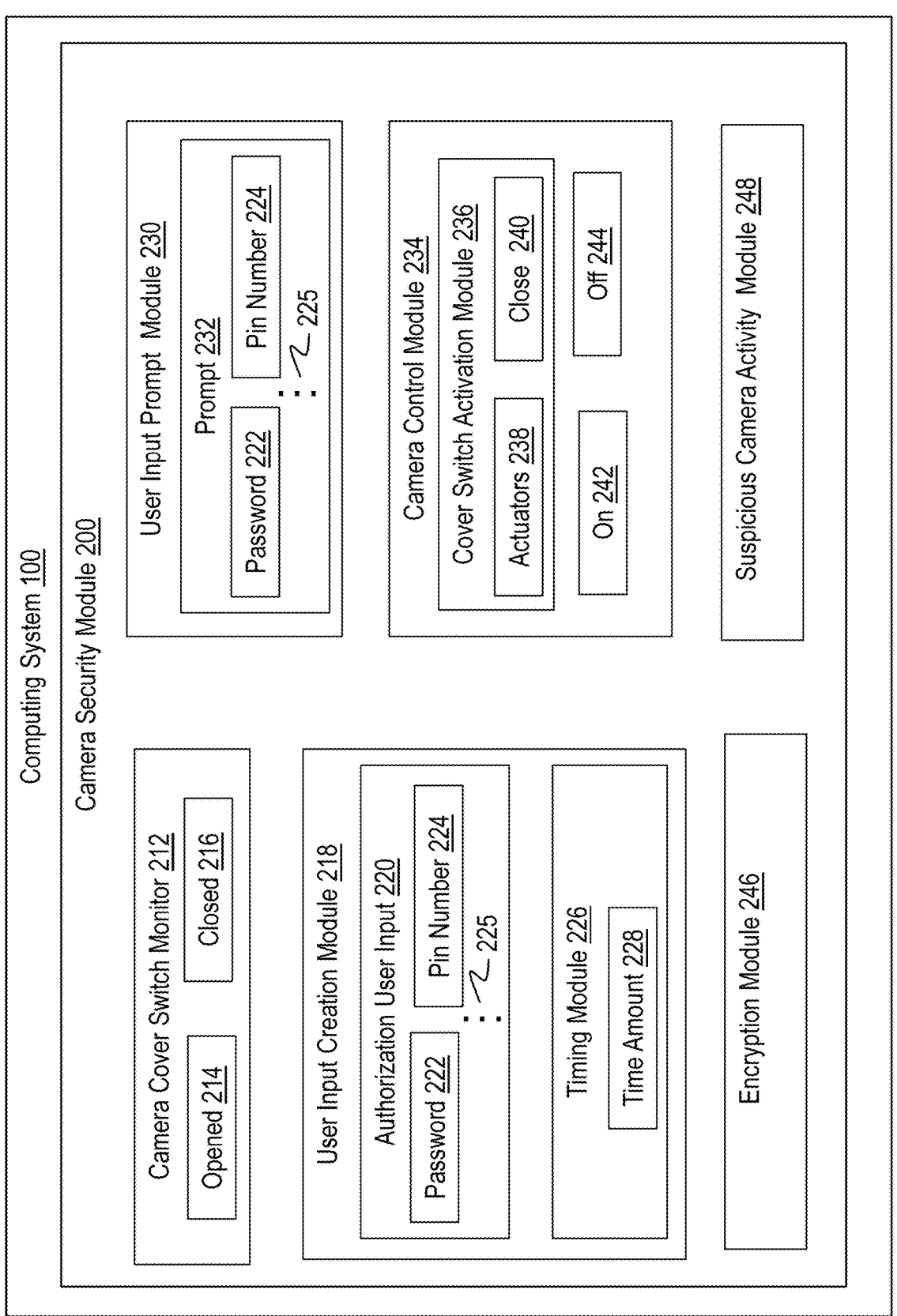
FIG. 2 discloses aspects of an embodiment of a camera security module according to the embodiments disclosed herein.

Advantageously, the embodiments disclosed herein provide for a camera security module that provides enhanced security for the camera 116. In particular, the embodiment disclosed here provide for the detection of when the camera 116 is activated by the movement of the camera cover switch 122. In response, the user of the computing system i100 s prompted to enter predetermined information such as a password or pin number that indicates that the user is authorized to use the camera. If the predetermined information is not entered without a predetermined amount of time, the camera is rendered inoperable. In this way, the risk that sensitive information or privacy FIG. 2 illustrates an embodiment of a camera security module 200. As illustrated, the camera security module 200 includes various functional modules. However, the embodiment of FIG. 2 is for ease of illustration only. Accordingly, in some embodiments there may be more or less than the modules illustrated in FIG. 2 as some of the modules may be combined or further divided. In addition, the modules of FIG. 2 may be implemented as part of the operating system of the computing system 100.

The camera security module 200 includes a camera cover switch monitor 212. In operation, the camera cover switch monitor 212 detects when the camera cover switch 122 has been activated. For example, when the user of the computing system 100 activates the camera cover switch 122 by moving the camera cover switch 122 into the gap 124, the camera cover switch monitor 212 detects that the camera cover switch 122 has been opened 214. As previously described, the opening 214 of the camera cover switch 122 activates (i.e., turns on) the camera 116. When the user of the computing system 100 activates the camera cover switch 122 by moving the camera cover switch 122 into the gap 126, the camera cover switch monitor 212 detects that the camera cover switch 122 has been closed 216. As previously described, the closing 216 of the camera cover switch 122 deactivates (i.e., turns off or renders inoperable) the camera 116.

The camera security module 200 includes a user input creation module 218. In operation, the user input creation module 218 requests if the user of the computing system 100 desires to require the input of authorization user input 220 that indicates that the user is authorized to use the camera 116 in order to keep the camera 116 operable. If the user of the computing system 100 desires to require authorization user input 220, the user input creation module 218 will then allow the user to enter one or more types of authorization user input 220 to be used.

The authorization user input 220 is input that should only be known by or related to the user of the computing system 100. For example, the authorization user input 220 may be a password 222, and/or a pin number 224. The ellipses 225 represent that the authorization user input 220 can be any other type of information known by or related to the user such as facial recognition or other types of bio-readable information.

In some embodiments, the user input creation module 218 includes a timing module 226. In operation, the timing module 218 allows the user of the computing system 100 to set a predetermined amount of time 228 for entering the authorization user input 220 before the camera 116 is rendered inoperable. In some embodiments, the predetermined amount of time 228 is set to be 30 seconds or less as this amount of time will typically provide enough time for the user to enter the authorization user input 220 without leaving the camera 116 activated for too long. In some embodiments, the predetermined amount of time 228 may be set by default to 30 seconds if the user of the computing system 100 does not set an amount of time. The embodiments disclosed herein are not limited to any particular predetermined amount of time 228 and so the user entered or the default predetermined amount of time 228 may be set to any other reasonable amount of time.

Figure 3:
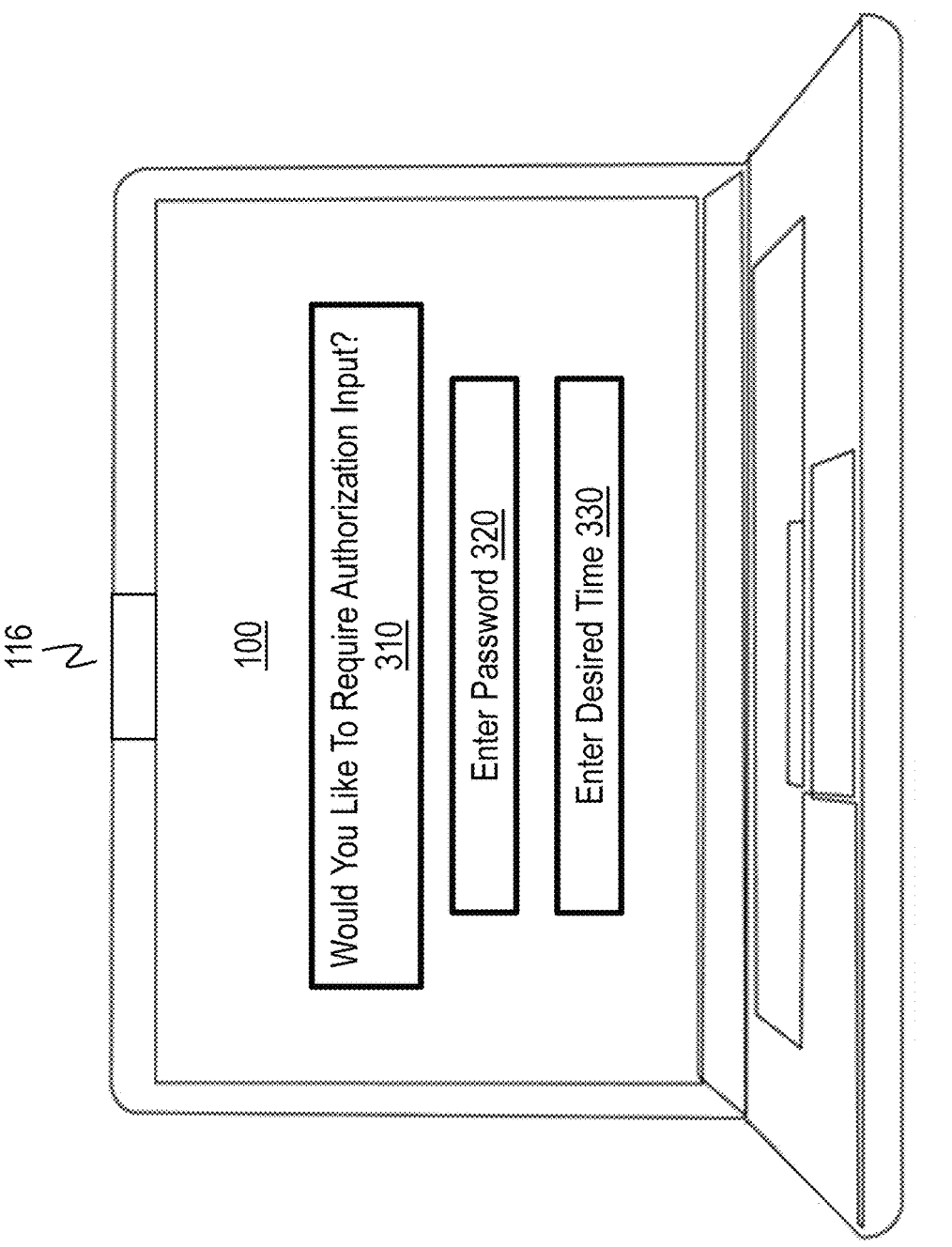
FIG. 3 discloses aspects of an embodiment of a user input creation module according to the embodiments disclosed herein.

FIG. 3 illustrates an embodiment of the operation of the user input creation module 218. As illustrated, at 310 the user of the computing system 100 is asked if he or she wants to require the input of the authorization user input 220. If yes, at 320, the user of the computing system 100 enters the authorization user input 220, which in the embodiment is a password 222. At 330, the user is able to enter the predetermined amount of time 228 in the embodiments that include the timing module 226.

The camera security module 200 includes a user input prompt module 230. Upon detection by the camera cover switch monitor 212 that the camera cover switch 122 has been opened 214, the user input prompt module 230 initiates a prompt 232 for the user of the computing system 100 to enter the authorization user input 220 such as the password 222, the pin number 224, or the other type of authorization user input 220 represented by the ellipses 225. The prompt 232 will also inform the user that the authorization user input 220 should be entered with the predetermined amount of time 228.

Figure 4:
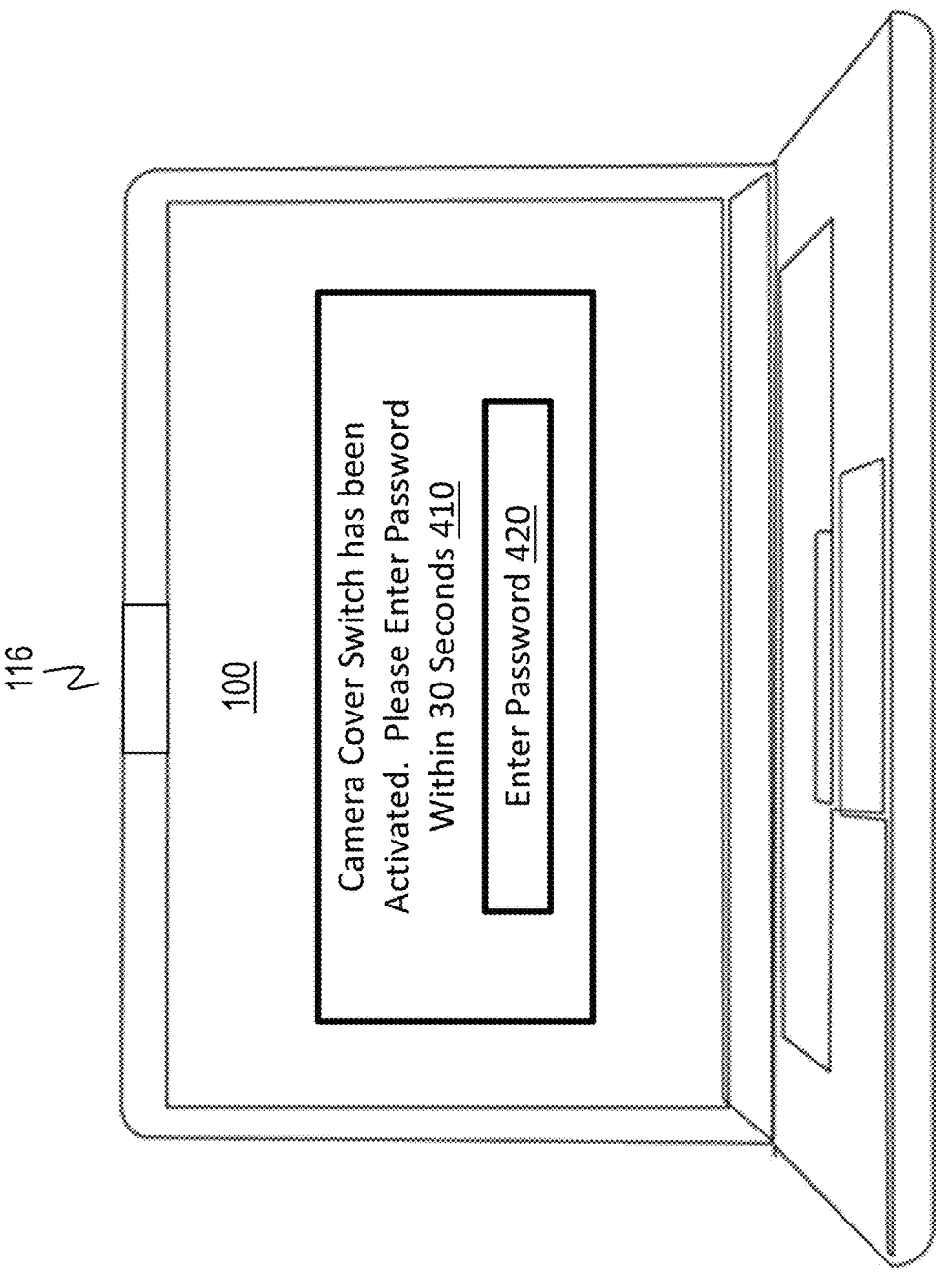
FIG. 4 discloses aspects of an embodiment of a user input prompt module according to the embodiments disclosed herein.

FIG. 4 illustrates an embodiment of the operation of the user input prompt module 230 in an embodiment where the user of the computing system 100 has previously input the password 222 as the authorization user input 220 to be used. At 410, a message is shown to the user of the computing system 100 indicating that the camera cover switch 122 has been activated and that the password 222 should be entered within the predetermined amount of time 228 of 30 seconds. At 420, the user of the computing system 100 is provided a password entry field where the password 222 can be entered.

The camera security module 200 includes a camera control module 234. In operation, the camera control module 234 monitors if the authorization user input 220 is entered within the predetermined amount of time 228. If the authorization user input 220 is entered within the predetermined amount of time 228, then the camera control module 234 allows the camera 116 to stay operable, that is turned on 242. For example, in the embodiment where the predetermined amount of time 228 is 30 seconds and the authorization user input 220 is the password 222, then if the password 222 is entered within 30 seconds, the camera control module 234 allows the camera 116 to stay turned on. However, if the authorization user input 220 is not entered within the predetermined amount of time 228, then the camera control module 234 takes action to automatically render the camera 116 inoperable, that is turned off 244.

In one embodiment, the camera control module 234 includes a cover switch activation module 236, that in operation controls the camera cover switch 122. In some embodiments, the computing system 100 includes actuators 238 that are configured to automatically close the camera cover switch 122. In such embodiments, the cover switch activation module 236 activates the actuators 238. The actuators 238 then automatically activate the camera cover switch 122 to close 240 the camera cover 120 by moving the camera cover switch 122 into the gap 126. Once the camera cover 120 has been closed, the camera is turned off and has thus been rendered inoperable.

In some embodiments, a malicious person may attempt to keep the camera 116 turned on by attempting to prevent the actuators 238 from allowing the camera cover switch 122 to move to the gap 126. In such embodiments, if the camera control module 234 detects that the camera cover switch cannot be activated to close the camera cover 120, the camera control module 234 will automatically turn off 244 the camera 116, thus rendering the camera 116 inoperable.

In other embodiments, the computing system 100 may not include the actuators 238. In such embodiments, when the authorization user input 220 is not entered within the predetermined amount of time 228, the camera control module 234 the camera control module 234 will automatically turn off 244 the camera 116, thus rendering the camera 116 inoperable.

Since the user of the computing system 100 should know the authorization user input 220, he or she will be able to enter the authorization user input 220 within the predetermined amount of time. By having the camera control module 234 automatically render the camera 116 inoperable when the authorization user input is not entered within the predetermined amount of time, the chance that the camera 116, the security and privacy risks previously described are greatly lessened.

In some embodiments, the camera security module 200 includes further security camera security capabilities. For example, in one embodiment camera security module 200 includes an encryption module 246. In operation, the encryption module 246 can be used to encryption module 246 can encrypt the authorization user input 220 by using any reasonable encryption algorithm. In this way, the authorization user input 220 will be protected if the computing system 100 is hacked into by a malicious person.

In further embodiment, the encryption module 246 can also encrypt any data captured by the camera 116. This encryption can be done using any reasonable encryption algorithm. Thus, even if the camera 116 does capture sensitive data or personal private data, this data will be encrypted and thus will not be useable by a malicious party.

In some embodiments, as a further camera security capability, the camera security module 200 includes a suspicious camera activity module 248. In operation, the suspicious camera activity module 248 monitors the data captured by the camera 116 for suspicious activity. Suspicious activity is activity that is indicative of an intent to access sensitive data or personal private data. For example, if all the data being captured is data related to banking or other financial information or if the data being captured is related to personal identifying information such as home addresses or work location, then the suspicious camera activity module 248 may determine that this is suspicious activity. In such case, the suspicious camera activity module 248 will cause the camera control module 234 to render the camera 116 inoperable in the manner previously described. If the camera 116 is in fact being used by the user of the computing system 100 to capture the sensitive data or personal private data, then the user is able to override the suspicious camera activity module 248.

It is noted that any operation(s) of any of the methods disclosed herein, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 5, an example method 500 is disclosed. The method 500 will be described in relation to one or more of the figures previously described, although the method 500 is not limited to any particular embodiment.

The method 500 includes detecting that a camera cover switch has been activated to open a cover of a camera of a computing system, the opening of the cover activating the camera for use (510). For example, as previously described the camera cover switch monitor 212 detects when the camera cover switch 122 has been activated by moving into the gap 124. This opens the camera cover 120 and turns on the camera 116.

The method 500 includes in response, prompting a user of the computing system to enter authorization user input that indicates the user is authorized to use the camera (520). For example, as previously described the user input prompt module 230 provides the prompt 232 to the user for the input of the authorization user input 220 such as the password 222.

The method 500 includes waiting a predetermined amount of time to receive the authorization user input (530). For example, as previously described the camera control module 234 detects if the authorization user input 220 has been input within the predetermined amount of time 228.

The method 500 includes in response to not receiving the authorization user input within the predetermined amount of time, automatically rendering the camera inoperable (540). For example, as previously described when the camera control module 234 detects that the authorization user input 220 has not been input within the predetermined amount of time 228, the camera control module 234 automatically renders the camera 116 inoperable in the manner previously described.

Following are some further example embodiments of the invention. These are presented only by way of example and are not intended to limit the scope of the invention in any way.

Embodiment 1. A method, comprising: detecting that a camera cover switch has been activated to open a cover of a camera of a computing system, the opening of the cover activating the camera for use; in response, prompting a user of the computing system to enter authorization user input that indicates the user is authorized to use the camera; waiting a predetermined amount of time to receive the predefined user input; and in response to not receiving the authorization user input within the predetermined amount of time, automatically rendering the camera inoperable.

Embodiment 2. The method as recited in embodiment 1, wherein automatically rendering the camera inoperable to the user comprises automatically activating the camera cover switch to close the cover of the camera.

Embodiment 3. The method as recited in embodiments 1-2, wherein in response to detecting that the camera cover switch cannot be activated to close the cover of the camera, automatically turning the camera off.

Embodiment 4. The method as recited in any of embodiments 1-3, wherein automatically rendering the camera inoperable to the user comprises automatically turning the camera off.

Embodiment 5. The method as recited in any of embodiments 1-4, wherein the authorization user input is a password.

Embodiment 6. The method as recited in any of embodiments 1-5, wherein the authorization user input is a pin number.

Embodiment 7. The method as recited in any of embodiments 1-6, wherein the predetermined amount of time is 30 seconds.

Embodiment 8. The method as recited in any of embodiments 1-7, further comprising: in response to receiving the authorization user input within the predetermined amount of time, allowing the cover to remain open or the camera to remain turned on.

Embodiment 9. The method as recited in any of embodiments 1-8, further comprising: encrypting data captured by the camera.

Embodiment 10. The method as recited in any of embodiments 1-9, further comprising: detecting suspicious camera activity; and in response detecting the suspicious camera activity, automatically rendering the camera inoperable.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that are executed on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to conduct executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
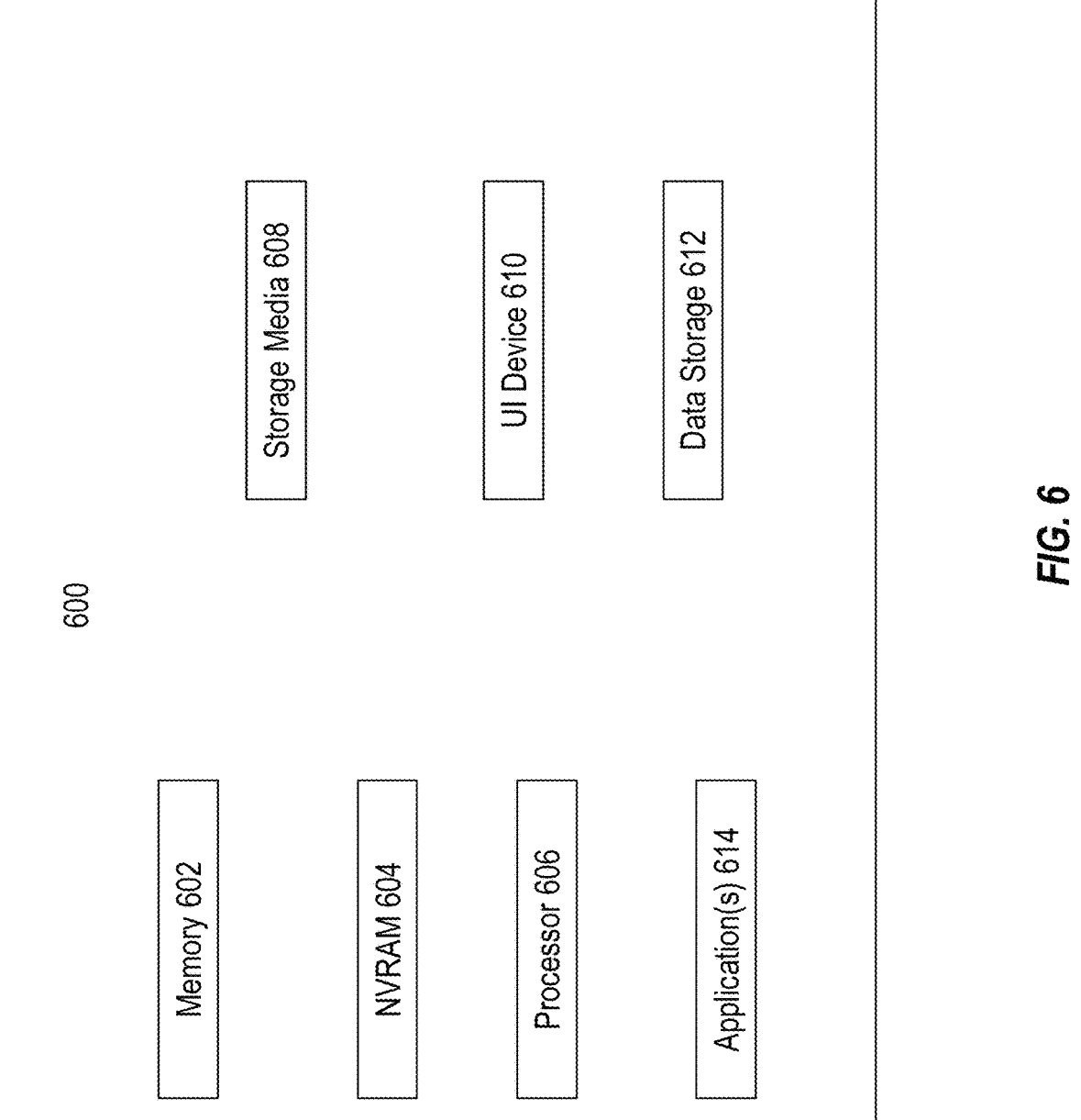
FIG. 6 discloses an example computing entity configured to perform any of the disclosed methods, processes, and operations.

With reference briefly now to FIG. 6, any one or more of the entities disclosed, or implied, by FIGS. 1A-5, and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    detecting that a camera cover switch has been activated to open a cover of a camera of a computing system, the opening of the cover activating the camera for use;
    in response, prompting a user of the computing system to enter authorization user input that indicates the user is authorized to use the camera;

waiting a predetermined amount of time to receive the authorization user input; and
    in response to not receiving the authorization user input within the predetermined amount of time, automatically rendering the camera inoperable by activating the camera cover switch to close the cover of the camera.

2. The method of claim 1, wherein in response to detecting that the camera cover switch cannot be activated to close the cover of the camera, automatically turning the camera off.

3. The method of claim 1, wherein automatically rendering the camera inoperable to the user further comprises automatically turning the camera off.

4. The method of claim 1, wherein the authorization user input is a password.

5. The method of claim 1, wherein the authorization user input is a pin number.

6. The method of claim 1, wherein the predetermined amount of time is 30 seconds.

7. The method of claim 1, further comprising:
    in response to receiving the authorization user input within the predetermined amount of time, allowing the cover to remain open or the camera to remain turned on.

8. The method of claim 1, further comprising:
    encrypting data captured by the camera.

9. The method of claim 1, further comprising:
    detecting suspicious camera activity; and
    in response detecting the suspicious camera activity, automatically rendering the camera inoperable.

10. A non-transitory storage medium having stored therein instructions that are executable by one or more hardware processors to perform operations comprising:
    detecting that a camera cover switch has been activated to open a cover of a camera of a computing system, the opening of the cover activating the camera for use;
    in response, prompting a user of the computing system to enter authorization user input that indicates the user is authorized to use the camera;
    waiting a predetermined amount of time to receive the authorization user input; and
    in response to not receiving the authorization user input within the predetermined amount of time, automatically rendering the camera inoperable by activating the camera cover switch to close the cover of the camera.

11. The non-transitory storage medium of claim 10, wherein in response to detecting that the camera cover switch cannot be activated to close the cover of the camera, automatically turning the camera off.

12. The non-transitory storage medium of claim 10, wherein automatically rendering the camera inoperable to the user further comprises automatically turning the camera off.

13. The non-transitory storage medium of claim 10, wherein the authorization user input is a password.

14. The non-transitory storage medium of claim 10, wherein the authorization user input is a pin number.

15. The non-transitory storage medium of claim 10, wherein the predetermined amount of time is 30 seconds.

16. The non-transitory storage medium of claim 10, further comprising:
    in response to receiving the authorization user input within the predetermined amount of time, allowing the cover to remain open or the camera to remain turned on.

17. The non-transitory storage medium of claim 10, further comprising:

encrypting data captured by the camera.

18. The non-transitory storage medium of claim 10, further comprising:

detecting suspicious camera activity; and in response detecting the suspicious camera activity, automatically rendering the camera inoperable.

\* \* \* \* \*